United States Patent
Giguet et al.

(10) Patent No.: US 10,271,374 B2
(45) Date of Patent: Apr. 23, 2019

(54) MONITORING NETWORK PERIODICITY AND IN RESPONSE ADAPTING PACKET SCHEDULING

(71) Applicant: Intel Corporation, Santa Clara, CA (US)

(72) Inventors: David Giguet, Toulouse (FR); Eric Perraud, Plaisance du touch (FR); Jerome Parron, Fuerth (DE); Sven Dortmund, Essen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/115,021

(22) PCT Filed: Dec. 8, 2015

(86) PCT No.: PCT/US2015/064457
§ 371 (c)(1),
(2) Date: Jul. 28, 2016

(87) PCT Pub. No.: WO2017/099726
PCT Pub. Date: Jun. 15, 2017

(65) Prior Publication Data
US 2018/0070404 A1    Mar. 8, 2018

(51) Int. Cl.
*H04W 76/28* (2018.01)
*H04W 72/12* (2009.01)
*H04W 52/02* (2009.01)
*H04W 76/27* (2018.01)
*H04W 24/02* (2009.01)
(Continued)

(52) U.S. Cl.
CPC ........... *H04W 76/28* (2018.02); *H04W 24/02* (2013.01); *H04W 52/0209* (2013.01); *H04W 52/0216* (2013.01); *H04W 72/1257* (2013.01); *H04W 76/27* (2018.02); *H04L 65/80* (2013.01); *H04W 24/08* (2013.01); *Y02D 70/00* (2018.01); *Y02D 70/1262* (2018.01); *Y02D 70/142* (2018.01); *Y02D 70/144* (2018.01);
(Continued)

(58) Field of Classification Search
CPC ........... H04W 52/0216; H04W 76/048; H04W 88/06
See application file for complete search history.

(56) References Cited

U.S. PATENT DOCUMENTS

2012/0207069 A1   8/2012  Xu
2012/0263051 A1  10/2012  Willars
(Continued)

OTHER PUBLICATIONS

PCT Search Report and Written Opinion in corresponding PCT application PCT/US2015/064457 dated Aug. 16, 2016 (11 pages).

*Primary Examiner* — Shukri Taha
(74) *Attorney, Agent, or Firm* — Trop Pruner & Hu, P.C.

(57) ABSTRACT

The UE VoIP engine monitors the network pattern periodicity and implements a scalable scheduling strategy that can adapt the VoIP engine and audio driver scheduling to the current local radio configuration in one embodiment. By adapting its scheduling, the VoIP engine can reduce mouth-to-ear delay or power consumption without impacting the audio encoding quality. The UE VoIP engine sends some scheduling preference to the network base station. The network base station monitors UE preferences and decide whether to ignore or accept UE preferences and allows the UE to operate in the conditions that provides the best tradeoff between power consumption and mouth-to-ear delay.

28 Claims, 5 Drawing Sheets

(51) Int. Cl.
*H04L 29/06* (2006.01)
*H04W 24/08* (2009.01)

(52) U.S. Cl.
CPC ............ *Y02D 70/168* (2018.01); *Y02D 70/23* (2018.01); *Y02D 70/24* (2018.01)

(56) References Cited

U.S. PATENT DOCUMENTS

2013/0343265 A1 12/2013 Ehsan
2014/0198699 A1 7/2014 Makharia et al.
2015/0341858 A1 11/2015 Hwang et al.

MONITORING NETWORK PERIODICITY AND IN RESPONSE ADAPTING PACKET SCHEDULING

BACKGROUND

This relates to the domain of cellular telecommunications, more precisely in the context of an Internet Packet (IP) Multimedia System (IMS).

In the definition of the IMS Voice over Long Term Evolution (LTE) standard, the User Equipment (UE) Voice Over Internet Packet (VoIP) engine does not take into account the Connected Discontinuous Reception (CDRX) cycle duration or semi-persistent scheduling (SPS) period configured by the cellular network. This lack of synergy between UE cellular data link layer and UE VoIP engine executing the Real-time Transport Protocol (RTP) and scheduling audio data driver read/write and network send/receive does not allow the UE to execute an audio voice call with an optimal latency and power performance.

BRIEF DESCRIPTION OF THE DRAWINGS

Some embodiments are described with respect to the following figures.

DETAILED DESCRIPTION

Figure 1:
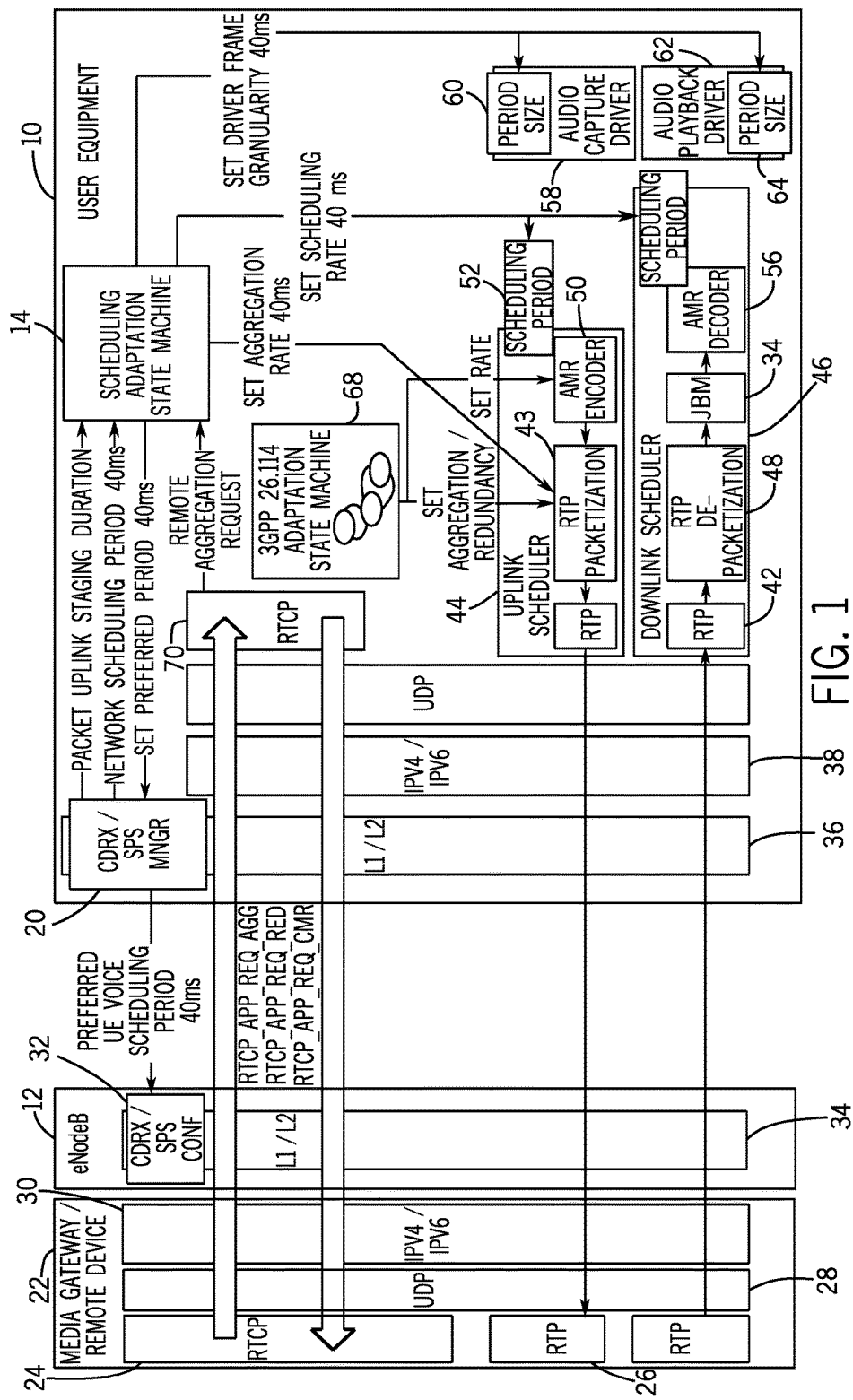
FIG. 1 is a schematic depiction for one embodiment.

The UE VoIP engine monitors the network pattern periodicity and implements a scalable scheduling strategy that can adapt the VoIP scheduling to the current local radio configuration in one embodiment. By adapting its scheduling, the VoIP engine can reduce mouth-to-ear delay or power consumption while keeping the audio transmission rate constant.

The lower telecommunication radio layer (data link) is kept independent from an upper layer (transport/application). It is possible for the lower layer to notify upper layers about the current CDRX cycle delay or the current SPS period value or to expose an application program interface (API) to set data link layer's preferences.

In one embodiment, the best trade-off between mouth-to-ear delay and power consumption of a Voice over Long Term Evolution (VoLTE) call is identified.

UE may be allowed to indicate to the network its preferred CDRX or SPS state for voice, based on UE latency, power performance or any other proprietary or device preference stored in the UE settings or computed at run time.

When connecting to a new network base station base station, the UE may provide its voice CDRX cycle or SPS period preference. The network base station may not support or may ignore the UE preference. The UE preference can be followed by the network base station when the network base station has no particular preference.

The UE preference may be based on criteria set by the manufacturer of the device. The UE equipment vendor suggests to the network network base station a configuration that is optimal for the device. For instance, for a device providing very good latency performance, the manufacturer may decide to request to use a network configuration that is more power efficient, i.e. a longer period CDRX cycle or SPS period, at the expense of a mouth-to-ear delay penalty.

The preference can also be set dynamically based on Real-time Transport Control Protocol (RTCP) measurements, VoIP Round Trip Time measurements, latency measurements or Jitter Buffer Management statistics which can indicate a good mouth-to-ear delay, and so the delay can be increased without any noticeable impact on the user experience. Therefore a UE can suggest a higher CDRX or SPS cycle. In other situations the UE can suggest a smaller CDRX or SPS if it detects a degradation of the voice quality.

Whether the UE preference is used or is ignored by the network, the UE VoIP engine monitors the current CDRX cycle or SPS period configuration. Based on this information, the VoIP engine adapts the VoIP engine scheduling rate, the audio driver data transfer scheduling rate, and the RTP aggregation rate to match the network periodicity. Matching the network periodicity avoids useless over-scheduling and achieves better network bandwidth usage when the network periodicity is large, and avoids penalizing mouth-to-ear delay when the network periodicity is small.

A better power/mouth-to-ear trade-off on the UE may be obtained by having the UE suggest a preferred CDRX or SPS cycle to the network in order to influence the network to an optimal configuration for this particular UE based on some intrinsic performance of the UE or based on some UE run-time statistics monitoring such as round trip delay, link quality or transmission signal level. Also, a better trade-off can be determined by matching the VoIP engine scheduling period to the network periodicity, which includes matching the VoIP engine scheduling rate, transfer rate of read/write from/to audio driver, and scheduling rate of packet sending with network periodicity.

A field preferred UE Voice Scheduling Period may be added inside the UE Assistance Information radio resource control (RRC) message sent to the network base station when the voice bearer is created at voice call start or during the voice call. Alternatively, a MAC control block or any appropriate signaling radio message may be used. The objective is to allow the UE to indicate to the network its preferred CDRX or SPS cycle for voice. The preference may be managed by the UE at creation of voice dedicated bearer, voice call start, or during the voice call. Modem settings may be configured to customize the preferred UE Voice Scheduling Period according to some UE overall latency, or power performance.

Even if the network accepts, rejects, or is not supporting the preferred UE Voice Scheduling Period UE preference, it is possible to optimize mouth-to-ear delay or power consumption by matching the UE VoIP engine scheduling period to the network scheduling periodicity settings.

The UE LTE data link layer exposes a high level interface that notifies clients about the initial value and value change of CDRX cycle and SPS period. It also provides an interface indicating the average time difference packet Uplink Staging Duration between the moment where the UE VoIP engine sends the packet to the UE data link layer and the On Duration period when the packet is transmitted to the base station. The UE VoIP engine monitors the network current scheduling periodicity in order to match its scheduling period and audio driver data transfer period with the current network scheduling periodicity.

The VoIP engine is capable of controlling the delay between packet reception and driver frame write operation by configuring audio and jitter buffer sizes to a value large enough to decode the frames included in the RTP packet(s), to absorb system latencies and to cancel the network jitter. The number of frames to process corresponds to the network periodicity factor ($n_{LTE}$ frames). Similarly, on the uplink path, thanks to the packet Uplink Staging Duration statistic provided by the data link layer the delay between read from audio driver and packet transmission can be controlled by the VoIP engine to be large enough to encode the n frames, corresponding to the UE scheduling periodicity factor, and absorb system latencies.

In the following, a power model and two different hardware models are considered. A first hardware (Implementation 1) is defined in Annex A and B. The power figures in Table 1 show the power consumption and mouth-to-ear delay for different values of $n_{LTE}$ and n. On one hand, optimizing power by increasing n from 1 to 2, when the network periodicity is $n_{LTE}=1$ leads to a significant (19.8%) improvement but at a major mouth-to-ear delay augmentation (15.7%). In this situation, matching VoIP engine scheduling with network scheduling allows optimizing mouth-to-ear delay when $n_{LTE}=n=1$. On the other hand, when the network periodicity is $n_{LTE}=2$, increasing n from 1 to 2, achieves the best trade-off by minimizing significantly power consumption (−18.6%) with a light impact on latency (+1.5%).

TABLE 1

Power consumption at 0 dBm and mouth-to-ear delay variations- Implementation 1. Percentages in parenthesis indicate performance variation when increasing n from 1 to 2.

| $p_A = 1_{mW}$ | n = 1 | n = 2 |
| --- | --- | --- |
| $n_{LTE} = 1$ | P(1, 1) = 496 mW | P(2, 1) = 398 mW (−19.8%) |
|  | D(1, 1) = 143 ms | D(2, 1) = 165.5 ms (+15.7%) |
| $n_{LTE} = 2$ | P(1, 2) = 366 mW | P(2, 2) = 298 mW (−18.6%) |
|  | D(1, 2) = 163.5 ms | D(2, 2) = 166 ms (+1.5%) |

TABLE 2

Power consumption at 30 dBm and mouth-to-ear delay variations- Implementation 1. Percentages in parenthesis indicate performance variation when increasing n from 1 to 2.

| $p_A = 1$ W | n = 1 | n = 2 |
| --- | --- | --- |
| $n_{LTE} = 1$ | P(1, 1) = 856 mW | P = −578 mW (−32.5%) |
|  | D(1, 1) = 143 ms | D(2, 1) = 165.5 ms (+15.7%) |
| $n_{LTE} = 2$ | P(1, 2) = 545 mW | P(2, 2) = 478 mW (−12.3%) |
|  | D(1, 2) = 163.5 ms | D(2, 2) = 166 ms (+1.5%) |

Consider a different hardware (Implementation 2) where the VoIP engine is located on the same processor as the data link layer. With this hardware, assume:

RTP packet read/write to/from the data link layer is immediate as located on the same processor ($T_{SOSO}'=0$, see Annex A)

Decoding and Encoding time are $T_D=1$ MS, $T_E=4$ ms (see Annex A). The results in Table 3 and Table 4 show the consistency of the tendency. Alignment of network scheduling period and VoIP engine scheduling provide a systematic improvement of the power with a low impact on mouth-to-ear delay.

TABLE 3

Power consumption at 0 dBm and mouth-to-ear delay variations - Implementation 2. Percentages in parenthesis indicate performance variation when increasing n from 1 to 2.

| $p_A = 1$ mW | n = 1 | n = 2 |
| --- | --- | --- |
| $n_{LTE} = 1$ | P(1, 1) = 409.4 mW | P(2, 1) = 341.9 mW (−16.5%) |
|  | D(1, 1) = 145 ms | D(2, 1) = 169 ms (+16.6%) |
| $n_{LTE} = 2$ | P(1, 2) = 309.3 mW | P(2, 2) = 271.8 mW (−12.3%) |
|  | D(1, 2) = 166 ms | D(2, 2) = 170 ms (+1.5%) |

TABLE 4

Power consumption at 30 dBm and mouth-to-ear delay variations-Implementation 2. Percentages in parenthesis indicate performance variation when increasing n from 1 to 2.

| $p_A = 1$ mW | n = 1 | n = 2 |
| --- | --- | --- |
| $n_{LTE} = 1$ | P(1, 1) = 769.4 mW | P(2, 1) = 521.9 mW (−32.2%) |
|  | D(1, 1) = 145 ms | D(2, 1) = 169 ms (+16.6%) |
| $n_{LTE} = 2$ | P(1, 2) = 489.4 mW | P(2, 2) = 451.9 mW (−7.7%) |
|  | D(1, 2) = 166 ms | D(2, 2) = 170 ms (+1.5%) |

When the VoIP engine is scheduled every n×20 ms, n frames have to be sent when the VoIP engine wakes up. In order to improve bandwidth efficiency, we propose in this invention that the VoIP engine configure aggregation rate to n×20 ms in order to send a single RTP packet including n frames. By doing that, the VoIP engine reduces the bandwidth consumption without compromising mouth-to-ear delay or power consumption.

Annex A: Power Model Description

We consider the following power consumption model:

$$P(n,n_{LTE},P_A)=P_0+P_c(n,n_{LTE},P_A)$$

where:
  n is the UE scheduling periodicity factor, VoIP engine is scheduled every $20 \times n_{ms}$
  $n_{LTE}$ is the network scheduling periodicity factor, CDRX cycle or SPS periodicity is equal to $20 \times n_{LTE}$ ms
  $p_A$ is the output power which depends on the distance to the network base station and the surrounding natural or artificial obstacles.
  $P(n,n_{LTE})$ is the overall UE power consumption
  $P_c(n,n_{LTE})$ is the UE power consumption of the RF, cellular phy and host as well as Application Process contributing to the execution of the voice call and that depends on n and $n_{LTE}$
  $P_0$ is the remainder UE power consumption from all the other contributors, it includes all other constant audio contributions such as codec and audio DSP processing The variable power contributors of the VoLTE call are listed below:
  1) Transmission of an RTP packet (includes digital processing and analog processing in Radio Frequency component)
  2) Reception of an RTP packet (includes digital processing and analog processing in Radio Frequency component)
  3) Audio RTP packet write to the data link layer
  4) Audio RTP packet read from the data link layer
  5) Audio Frame processing and write to the audio driver
  6) Audio Frame processing and read from the audio driver
  7) Audio Frame hardware transfer from the audio driver buffer to the audio subsystem
  8) Audio Frame hardware transfer from the audio subsystem to the audio driver buffer This model also considers the worst case scenario where these activities are independent, i.e. activities executed on the same component do not overlap in time and therefore their total power contribution is equal to the sum of the power contribution of each single activity.

The power model for the VoIP engine contribution is:

$$P_c(n, n_{LTE}, p_A) = (P_T(p_A) \times R_T(n, n_{LTE}) + P_R \times R_R(n_{LTE}) + P_{S0'} \times R_{S0'}(n, n_{LTE}) + P_{S0} \times (n)$$

Where:
- $P_T$ is the power consumed by RF component when transmitting a packet, it depends on the actual output signal power. $R_T(n, n_{LTE})$ is the residency percentage in transmitting state, i.e. the proportional time spent by the RF in transmitting state.
- $P_T$ is the power consumed by the RF component when the receive block is turned on. $R_R(n, n_{LTE})$ is the residency percentage of RF component in receiving state.
- $P_{S0}$ is the power consumption in system state S0 and $R_{S0}(n)$ is the residency percentage in this state.
- $P_{C0}$ is the power consumption in system state C0 and $R_{C0}(n)$ is the residency percentage in this state.

The definition of the states is the following:
- In S1 state, there is no central processing unit (CPU) activity, voltage are reduced, the system is in low power mode.
- In S0 state, all the processors are idle and all the peripherals are inactive but voltage are in high consumption state. The system is in the state during the transition to or from low power system state (S1).
- In S0' state, all the processors are idle but hardware is handling the transfer of RTP packets to or from the radio data link layer. It includes the S0 state consumption and the extra power consumed to read or write a packet.
- In C0 state, one of the processor core is running at highest frequency. As speech processing (encode and decode for instance) is mainly frame-based, and carries a state from one frame to the next, it is not possible to parallelize processing on different processors. Therefore, only single processor power state has to be taken into account in some embodiments.

The power model described will be used herein to evaluate the gain of some embodiments.

Let
- $T_T$ is the duration of a transmission
- $T_R$ is the duration during which the receiver block is powered on.
- $T_{S0,S1}'$ be the sum of the entry and exit time between S0 and S1 states in ms.
- $T_{So}$ be the RTP packet transfer latency during which the system is in state S0'
- $T_D$ be the downlink processing time (decoding)
- $T_U$ be the uplink processing time (encoding)

The residency contribution of (1) in paragraph 21 is:

$$100 \times \frac{T_T}{20 \times \max(n, n_{LTE})}$$

The residency contribution of (2) is:

$$100 \times \frac{T_R}{20 \times n_{LTE}}$$

The residency contribution of (3) is:

$$100 \times \frac{T'_{S0S0}}{20 \times n}$$

to state S0' and $$100 \times \frac{T'_{S0S1}}{20 \times n}$$

to state S0

The residency contribution of (4) is:

$$100 \times \frac{T'_{S0S0}}{20 \times n_{LTE}}$$

to state S0' and $$100 \times \frac{T'_{S0S1}}{20 \times n}$$

to state S0

The residency contribution of (5) is $$100 \times \frac{T_D}{20}$$

to state C0' and $$100 \times \frac{T_{S0S1}}{20 \times n}$$

to state S0

The residency contribution of (6) is:

$$100 \times \frac{T_{DU}}{20}$$

to state C0 and $$100 \times \frac{T_{S0S1}}{20 \times n}$$

to state S0

The residency contribution of (7) and (8) is:

$$100 \times \frac{T_{S0S1}}{20 \times n}$$

to state S0

The total power consumption is:

$$P_c(n, n_{LTE}, p_A) = P_0 + P_T(p_A) T_T \left( \frac{1}{20 \times \max(n, n_{LTE})} \right) +$$

-continued $$P_R T_R \left(\frac{1}{20 \times n_{LTE}}\right) + P_{S0} T_{S0S1}\left(\frac{5}{20 \times n} + \frac{1}{20 \times n_{LTE}}\right) + P_{S0}, T_{S0S0},$$

$$\left(\frac{1}{20 \times n} + \frac{1}{20 \times n_{LTE}}\right) + P_{C0}\frac{T_D + T_U}{20}$$

The following values are used:

$P_0$=50 mW, $P_{S0}$=300 mW, $P_{S0'}$=600 mW, $P_{C0}$=337.5 mW and $P_T$=($p_A$=1 mW)$P_T$($p_A$=1000 mW)=2800 mW and $P_R$=500 mW and $T_{S0S1}$=1 ms, $T_{S0S0'}$=2 ms, $T_D$=0.5 ms, $T_E$=2.5 ms and $D_0$=120 ms ms Annex B:

Let $D(n,n_{LTE})$ be the mouth-to-ear delay, its value can be as follows:

$$D(n,n_{LTE})=D_0+\max{}^{S0}(n_{LTE},n) \times 20 + nT_u + n_{LTE}T_D$$

An enhancement of IMS UE solutions compliant with 3GPP 26.114 specifications may be implemented in some embodiments. An architecture of the proposed modified IMS system is shown in FIG. 1. The user equipment 10 is coupled over the radio interface with the network base station 12 and media gateway/remote device 22. The media gateway/remote device 22 includes RTP control protocol (RTCP) 24, RTP 26, user datagram protocol (UDP) 28, Internet Protocol Version 4 (IPV4)/Internet Protocol Version 6 (IPV6 30).

The network base station includes the CDRX/SPS control 32 within an L1/L2 34.

The user equipment includes control channels L1/L2 36, IPV4/IPV6 38, UDP 40 and RTP 42 within both the uplink scheduler 44 and downlink scheduler 46. The uplink scheduler includes an RTP packetization 43 and the downlink scheduler includes RTP depacketization 48. The uplink scheduler includes an adaptive multi-rate (AMR) encoder 50 and scheduling period setting 52. The downlink controller includes Jitter Buffer Management (JBM) 54 and AMR decoder 56.

The user equipment also includes an audio capture driver 58 with a period size 60 and an audio playback driver 62 with a period size setting 64. The scheduling and adaptation state machine 14 sets the driver frame granularity in the period size 60 and 64. It also sets the scheduling rate and the scheduling period 66 within the downlink scheduler 46. A 3GPP 26.114 adaptation state machine 68 sets the rate in the AMR encoder 50, the aggregation and redundancy rate in the RTP packetization 43. The scheduling adaptation state machine receives a packet uplink staging duration from the CDRX/SPS manager 20 and provides a set preferred period to that manager. The scheduling adaptation state machine also receives a remote aggregation request from the RTCP 70.

At call establishment or at RRC connection or during the VoLTE call, the UE 10 data link layer CDRX/SPS manager block 20 receives a preferred network periodicity from the UE system upper layer (say 40 ms) including the scheduling adaption state machine 14. This setting can be a best guess about the acceptable mouth-to-ear delay based on past history for the called terminal, or any other relevant information. The CDRX/SPS manager suggests to the eNB 12 that 40 ms is the preferred CDRX or SPS cycle. It forwards this preference to the network base station using the new parameter called "preferred UE Voice Scheduling Period" parameter of a RRC message (typically UE Assistance Information) or using any other relevant signaling means to the network base station. The CDRX/SPS manager exposes an API to the upper layers to notify about changes of the applied network scheduling periodicity that may or may not be equal to the preferred UE Voice Scheduling Period preference.

The Scheduling Adaptation State Machine (SASM) 14 is managing the adaptation of the VoIP the data link layer state. The SASM module takes two parameters as inputs:

The remote RTCP request for aggregation as defined in 3GPP 26.114 specification (RTCP_APP_REQ_AGG).

The CDRX cycle current value (or SPS pattern period), i.e. the periodicity of packet transmission on the network.

The statistics regarding the staging duration of the packets in the data link layer (packet Uplink Staging Duration).

The SASM module modifies the preferred UE Voice Scheduling Period parameter in the data link layer CDRX manager block and the RTP packetization block aggregation rate, the downlink and uplink scheduling period and the audio driver capture and playback frame granularity.

The actual preferred configuration may be coming from a custom database of the UE or from RTCP measurements. If latency estimation based on RTCP measurement shows that the mouth-to-ear delay can be increased (to reduce the current drain) with an acceptable voice quality, this parameter is increased.

By default the RTP packetization block aggregation rate is set to 20 ms in one embodiment. If a RTCP aggregation request is received, the RTP packetization aggregation rate may be set to the value requested by the remote to comply with 3GPP specifications.

If no RTCP aggregation has been received, then the RTP packetization is configured to match the network scheduling periodicity.

By default the downlink and uplink scheduling period is set 20 ms to optimize mouth-to-ear delay in one embodiment. If the network scheduling periodicity is strictly greater than 20 ms, then the scheduling on uplink and downlink period are configured to match to this network period.

By default the audio driver capture and playback frame granularity is set 20 ms to optimize mouth-to-ear delay in one embodiment. If the network periodicity is strictly greater than 20 ms, then the capture and playback driver granularity is configured to match the network period.

SASM module attempts to achieve the best power of the VoLTE call while not degrading the perceived voice call quality.

Figure 2:
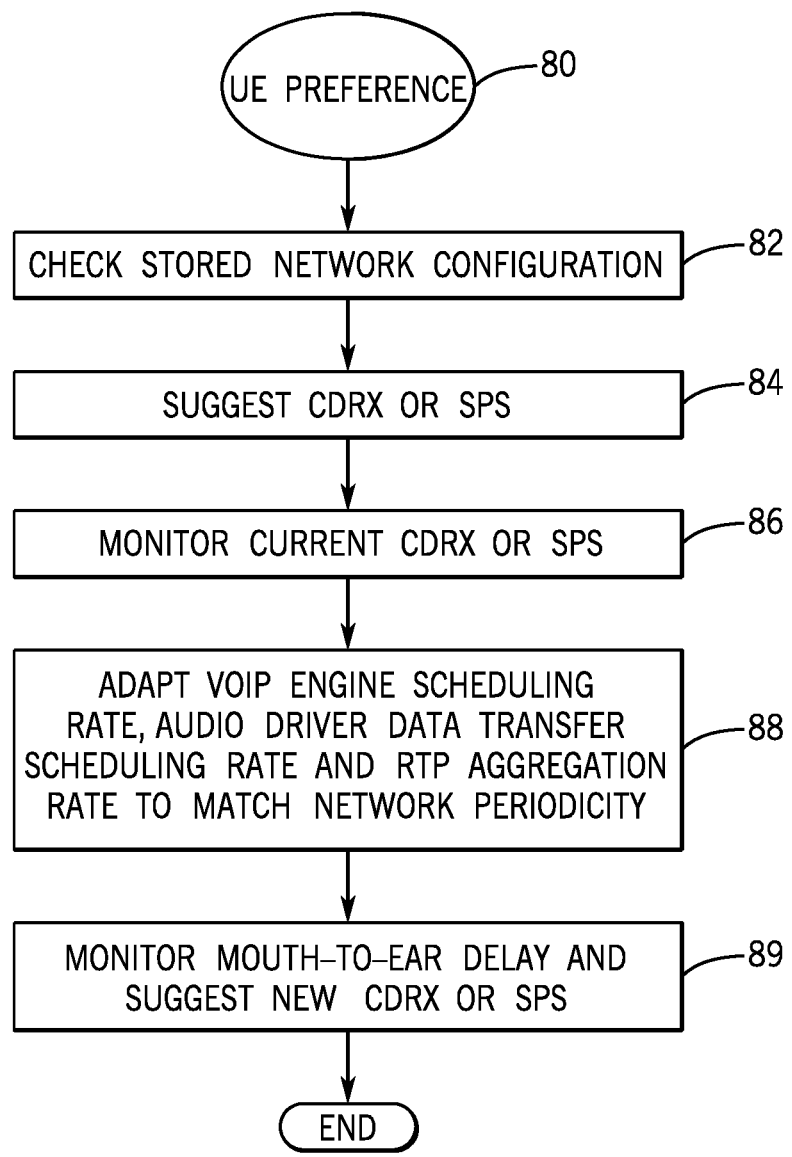
FIG. 2 is a flow chart for one embodiment of user equipment.
Figure 3:
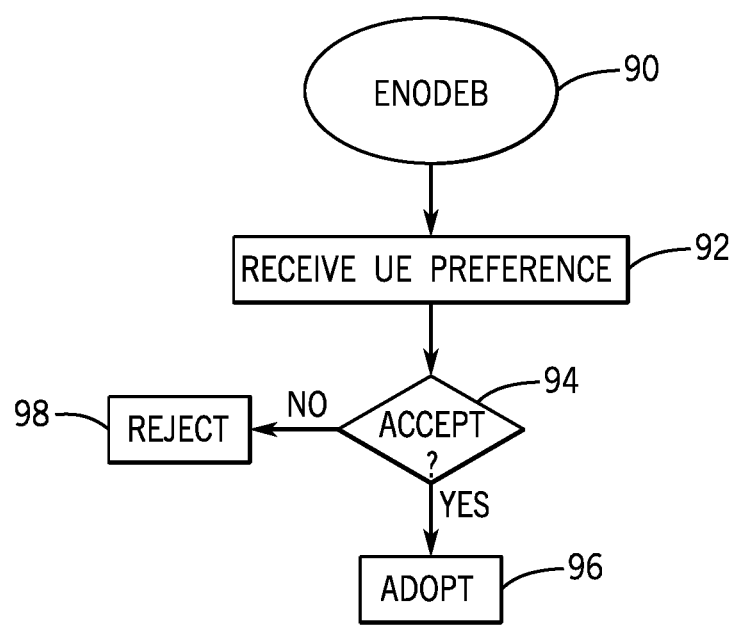
FIG. 3 is a flow chart for one embodiment of network base station.

The sequences shown in FIGS. 2 and 3 may be implemented in software, firmware and/or hardware. In software and firmware embodiments they may be implemented by computer executed instructions stored in one or more non-transitory computer readable media such as magnetic, optical or semiconductor storage.

The sequence 80 for the user equipment preference selection and transmission to the network base station, shown in FIG. 2, begins by checking a stored network configuration as indicated in block 82. This configuration may be set by the manufacturer to achieve certain performance characteristics.

This information may be provided to the network base station as indicated in block 84 in the form of a suggestion for a CDRX or SPS timing.

Whether the suggestion of a preference is accepted by the network base station or not, the user equipment continues to monitor the current CDRX or SPS durations, as indicated in block 86.

As needed, the user equipment may adapt the VoIP engine scheduling rate, audio driver data transfer scheduling rate and/or RTP aggregation rate to match the current network periodicity as indicated in block 88.

Using RTCP reports, the user equipment may monitor the current mouth-to-ear delay and dynamically suggest a new CDRX or SPS configuration to the network in block 89.

As shown in FIG. 3, a sequence 90 for implementing the user equipment preference suggestion at a network base station begins by receiving a user equipment preference suggestion as indicated in block 92. This may be done by checking the latest known user's preference regarding an CDRX or SPS cycle. A check at diamond 94 indicates whether or not the UE preference suggestion is acceptable. Then in block 96, if the user equipment suggestion is acceptable, the suggestion is accepted and otherwise is indicated in block 98 it is ignored. This may be done by setting the network CDRX or SPS cycle accordingly at the creation of an audio bearer or at call establishment. This allows the user equipment to work in the configuration that offers the best trade-off between user equipment power consumption and call mouth-to-ear delay. The network base station may decide if the CDRX or SPS cycle can be changed based on the type of traffic or based on network base station metrics. If so, the appropriate cycle may be set during the course of a call.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

Figure 4:
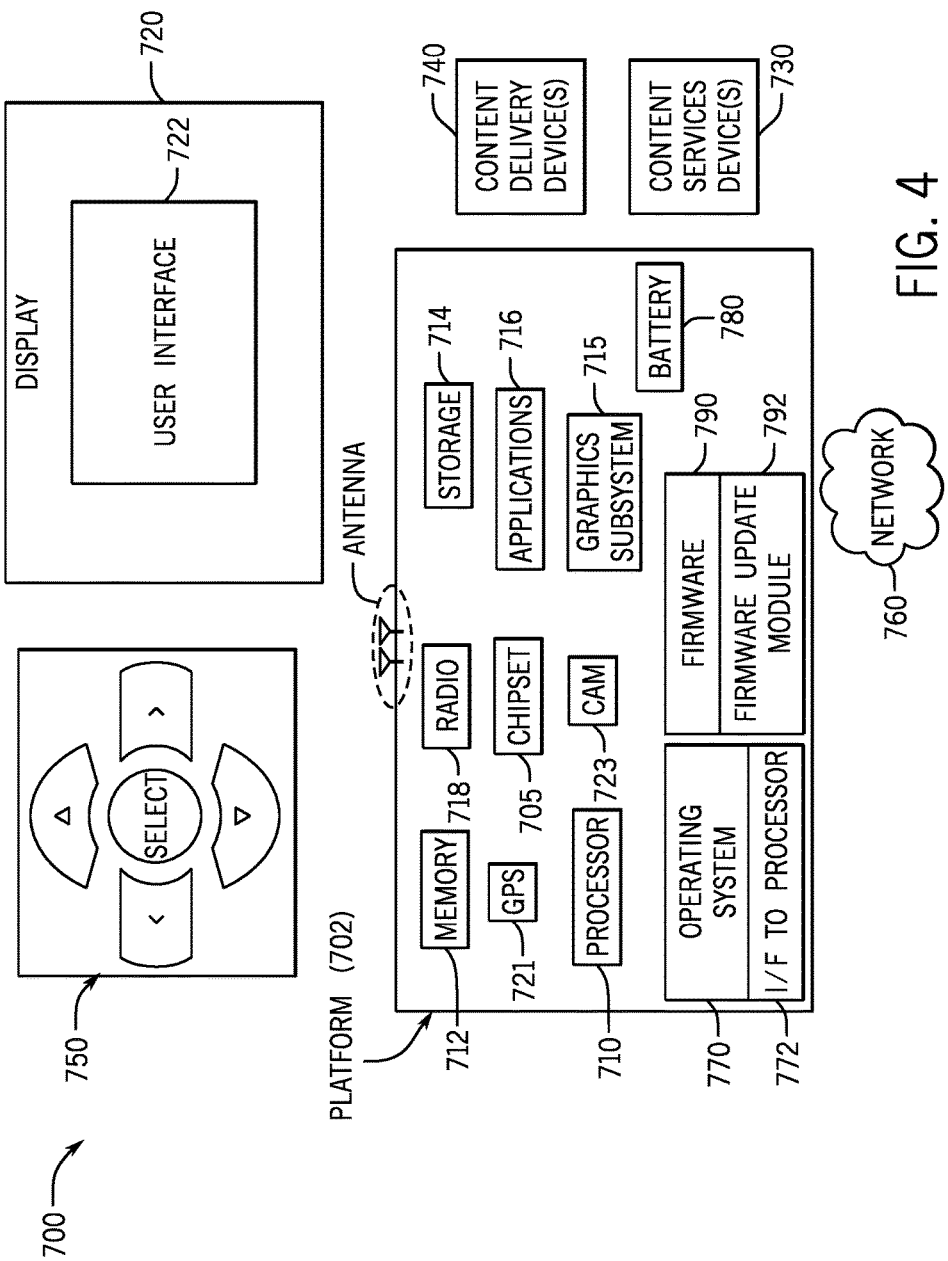
FIG. 4 is a system depiction for one embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 2 and 3 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
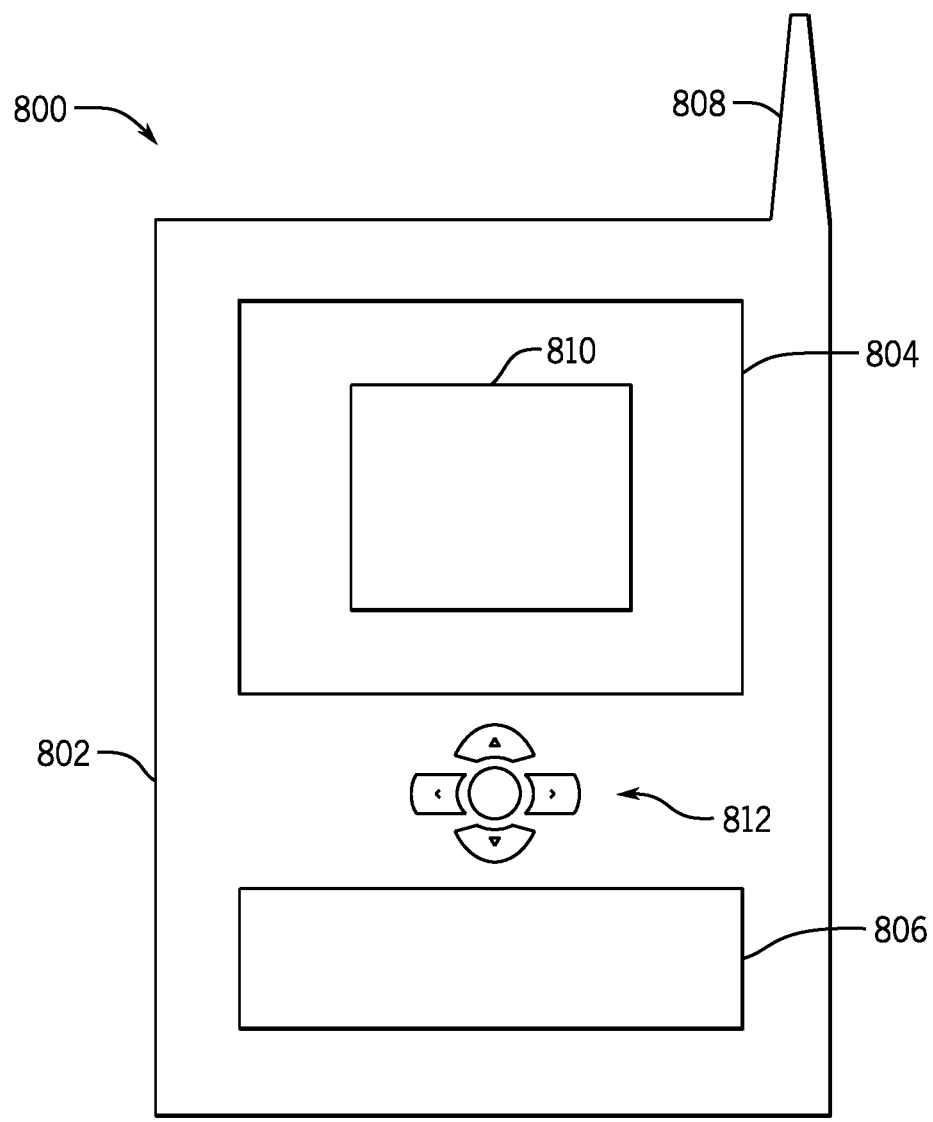
FIG. 5 is front elevation of a system according to one embodiment.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As shown in FIG. 5, device 800 may comprise a housing 802, a display 804 and 810, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

The following clauses and/or examples pertain to further embodiments:

One example embodiment may be a method comprising monitoring network pattern periodicity by the User Equipment, and based on said periodicity, adapting voice over Internet packet scheduling to a current radio configuration to reduce mouth-to-ear delay or power consumption without degrading the perceived audio encoding quality. The method may also include finding the best trade-off between power consumption reduction and mouth-to-ear delay reduction options based on an effect of each option on latency. The method may also include enabling a user equipment to indicate a preference to the network base station for a connected discontinuous reception cycle duration (CDRX) or semi-persistent scheduling (SPS) period for voice. The method may also include wherein in the preference is specified by a user equipment manufacturer. The method may also include dynamically changing the preference based on real-time conditions. The method may also include suggesting in response to measurements of real-time conditions that the mouth-to-ear delay can be increased or decreased and computing the maximum acceptable mouth-to-ear change. The method may also include where said measurements are VoIP Round Trip Time or latency measurements. The method may also include suggesting to a network base station that the CDRX cycle can be increased or decreased and suggesting a preferred CDRX cycle. The method may also include wherein a voice over Internet protocol engine adapts its scheduling rate based on the CDRX cycle or SPS period to match network periodicity. The method may also include matching an audio driver data transfer period with the current network scheduling periodicity. The method may also include forwarding the preference to a network base station via a radio resource control (RRC) message or MAC signaling.

In another example embodiment may be a method comprising checking a latest known user equipment preference regarding a connected discontinuous reception (CDRX) or semi-persistent scheduling (SPS) cycle, deciding whether to ignore or accept the user equipment's preference, and setting the network CDRX or SPS cycle accordingly at the creation of the audio bearer. The method may also include deciding if CDRX or SPS cycle for a given user equipment can be changed based on the type of traffic for the user equipment or based on internal base station metrics, and setting the CDRX or SPS cycle accordingly during the course of a call.

Another embodiment may be one or more non-transitory computer readable media storing instructions to perform a sequence comprising monitoring network pattern scheduling periodicity by the User Equipment, and based on said periodicity, adapting voice over Internet packet scheduling to a current radio configuration to reduce mouth-to-ear delay or power consumption without degrading the perceived audio encoding quality. The media may further include storing instructions to perform a sequence including finding the best trade-off between power consumption reduction and mouth-to-ear delay reduction options based on an effect of each option on latency. The media may further include storing instructions to perform a sequence including enabling a user equipment to indicate a preference to the network base station for a connected discontinuous reception cycle duration (CDRX) or semi-persistent scheduling (SPS) period for voice. The media may further include storing instructions to perform a sequence including suggesting in response to measurements of real-time conditions that the mouth-to-ear delay can be increased or decreased and computing the maximum acceptable mouth-to-ear change. The media may further include storing instructions to perform a sequence including suggesting to a network base station that the CDRX cycle can be increased or decreased and suggesting a preferred CDRX cycle. The media may further include storing instructions to perform a sequence wherein a voice over Internet protocol engine adapts its scheduling rate based on the CDRX cycle or SPS period to match network periodicity. The media may further include storing instructions to perform a sequence including matching an audio driver data transfer period with the current network scheduling periodicity. The media may further include storing instructions to perform a sequence including forwarding the preference to a network base station via a radio resource control (RRC) message or MAC signaling.

In another example embodiment may be an apparatus comprising a processor to monitor network pattern scheduling periodicity by the User Equipment, and based on said periodicity, adapt voice over Internet packet scheduling to a current radio configuration to reduce mouth-to-ear delay or power consumption without degrading the perceived audio encoding quality, and a memory coupled to said processor. The apparatus may include said processor to find the best trade-off between power consumption reduction and mouth-to-ear delay reduction options based on an effect of each option on latency. The apparatus may include said processor to enable a user equipment to indicate a preference to the network base station for a connected discontinuous reception cycle duration (CDRX) or semi-persistent scheduling (SPS) period for voice. The apparatus may include said processor to suggest in response to measurements of real-time conditions that the mouth-to-ear delay can be increased or decreased and computing the maximum acceptable mouth-to-ear change. The apparatus may include said processor to suggest to a network base station that the CDRX cycle can be increased or decreased and suggesting a preferred CDRX cycle. The apparatus may include wherein a voice over Internet protocol engine adapts its scheduling rate based on the CDRX cycle or SPS period to match network periodicity. The apparatus may include said processor to forward the preference to a network base station via a radio resource control (RRC) message or MAC signaling. The apparatus may include a display communicatively coupled to the processor. The apparatus may include a battery coupled to the processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   monitoring network pattern periodicity at User Equipment;
   suggesting one of connected discontinuous reception (CDRX) or semi-persistent scheduling (SPS) cycle;
   monitoring a current CDRX or SPS;
   based on said periodicity, adapting a voice over Internet packet engine scheduling to a current radio configuration rate, an audio driver data transfer scheduling rate and a Real-time Transport Protocol (RTP) aggregation rate to match the monitored network pattern periodicity; and
   monitoring mouth-to-ear delay and suggesting a new CDRX or SPS to reduce mouth-to-ear delay or power consumption without degrading the perceived audio encoding quality.

2. The method of claim 1 including finding the best trade-off between power consumption reduction and mouth-to-ear delay reduction options based on an effect of each option on latency.

3. The method of claim 1 including enabling a user equipment to indicate a preference to the network base station for a connected discontinuous reception cycle duration (CDRX) or semi-persistent scheduling (SPS) period for voice.

4. The method of claim 3 wherein in the preference is specified by a user equipment manufacturer.

5. The method of claim 3 including dynamically changing the preference based on real-time conditions.

6. The method of claim 5 including suggesting in response to measurements of real-time conditions that the mouth-to-ear delay can be increased or decreased and computing the maximum acceptable mouth-to-ear change.

7. The method of claim 6 where said measurements are VoIP Round Trip Time or latency measurements.

8. The method of claim 6 including suggesting to a network base station that the CDRX cycle can be increased or decreased and suggesting a preferred CDRX cycle.

9. The method of claim 3 wherein a voice over Internet protocol engine adapts its scheduling rate based on the CDRX cycle or SPS period to match network periodicity.

10. The method of claim 1 including matching an audio driver data transfer period with the current network scheduling periodicity.

11. The method of claim 1 including forwarding the preference to a network base station via a radio resource control (RRC) message or MAC signaling.

12. One or more non-transitory computer readable media storing instructions to perform a sequence comprising:
    monitoring network pattern scheduling periodicity at User Equipment;
    suggesting one of connected discontinuous reception (CDRX) or semi-persistent scheduling (SPS) cycle;
    monitoring a current CDRX or SPS;
    based on said periodicity, adapting voice over Internet packet scheduling rate, an audio driver data transfer scheduling rate and a Real-time Transport Protocol (RTP) aggregation rate to match the monitored network pattern periodicity; and
    monitoring mouth-to-ear delay and suggesting a new CDRX or SPS to reduce mouth-to-ear delay or power consumption without degrading the perceived audio encoding quality.

13. The media of claim 12, further storing instructions to perform a sequence including finding the best trade-off between power consumption reduction and mouth-to-ear delay reduction options based on an effect of each option on latency.

14. The media of claim 12, further storing instructions to perform a sequence including enabling a user equipment to indicate a preference to the network base station for a connected discontinuous reception cycle duration (CDRX) or semi-persistent scheduling (SPS) period for voice.

15. The media of claim 14, further storing instructions to perform a sequence including suggesting in response to measurements of real-time conditions that the mouth-to-ear delay can be increased or decreased and computing the maximum acceptable mouth-to-ear change.

16. The media of claim 15, further storing instructions to perform a sequence including suggesting to a network base station that the CDRX cycle can be increased or decreased and suggesting a preferred CDRX cycle.

17. The media of claim 14, further storing instructions to perform a sequence wherein a voice over Internet protocol engine adapts its scheduling rate based on the CDRX cycle or SPS period to match network periodicity.

18. The media of claim 12, further storing instructions to perform a sequence including matching an audio driver data transfer period with the current network scheduling periodicity.

19. The media of claim 12, further storing instructions to perform a sequence including forwarding the preference to a network base station via a radio resource control (RRC) message or MAC signaling.

20. An apparatus comprising:
    a processor to monitor network pattern scheduling periodicity at User Equipment, suggest one of connected discontinuous reception (CDRX) or semi-persistent scheduling (SPS)cycle, monitor a current CDRX or SPS, based on said periodicity, adapt a voice over Internet packet engine scheduling rate, an audio driver data transfer scheduling rate and a Real-time Transport Protocol (RTP) aggregation rate to match the monitored network pattern periodicity, monitor monitoring mouth-to-ear delay and suggesting anew CDRX or SPS to reduce mouth-to-ear delay or power consumption without degrading the perceived audio encoding quality; and
    a memory coupled to said processor.

21. The apparatus of claim 20, said processor to find the best trade-off between power consumption reduction and mouth-to-ear delay reduction options based on an effect of each option on latency.

22. The apparatus of claim 20, said processor to enable a user equipment to indicate a preference to the network base station for a connected discontinuous reception cycle duration (CDRX) or semi-persistent scheduling (SPS) period for voice.

23. The apparatus of claim 20, said processor to suggest in response to measurements of real-time conditions that the mouth-to-ear delay can be increased or decreased and computing the maximum acceptable mouth-to-ear change.

24. The apparatus of claim 23, said processor to suggest to a network base station that the CDRX cycle can be increased or decreased and suggesting a preferred CDRX cycle.

25. The apparatus of claim 22 wherein a voice over Internet protocol engine adapts its scheduling rate based on the CDRX cycle or SPS period to match network periodicity.

26. The apparatus of claim 20, said processor to forward the preference to a network base station via a radio resource control (RRC) message or MAC signaling.

27. The apparatus of claim 20, including a display communicatively coupled to the processor.

28. The apparatus of claim 20, including a battery coupled to the processor.

* * * * *